United States Patent
Adams

Patent Number: 6,131,865
Date of Patent: Oct. 17, 2000

[54] SUCTION CUP HOLDER WITH ONE PIECE CLIP

[75] Inventor: William E. Adams, Portersville, Pa.

[73] Assignee: Adams Mfg. Corp., Portersville, Pa.

[21] Appl. No.: 09/122,557

[22] Filed: Jul. 24, 1998

[51] Int. Cl.[7] .................................................... A45D 42/14
[52] U.S. Cl. .................................... 248/206.2; 248/205.5; D8/368
[58] Field of Search ................................ 248/206.2, 205.5, 248/205.7, 305, 316.1, 683, 684, 363, 467; 24/343, DIG. 27, DIG. 28, DIG. 29, 346; 40/659, 658

[56] References Cited

U.S. PATENT DOCUMENTS

| | | | |
|---|---|---|---|
| D. 174,366 | 3/1955 | Ziskind | D8/368 |
| 253,392 | 2/1882 | Middletown | 248/205.5 |
| D. 311,933 | 11/1990 | Adams | D20/43 |
| 840,618 | 1/1907 | Golombek | 248/205.5 |
| 1,575,789 | 3/1926 | Phelps | 248/205.5 |
| 1,839,694 | 1/1932 | Nelson et al. | 248/205.5 |
| 1,847,403 | 3/1932 | Loughman | 40/597 |
| 1,922,900 | 8/1933 | Plante | 40/659 |
| 2,276,992 | 3/1942 | Manzler | 24/350 |
| 2,467,251 | 4/1949 | Bowman | 248/205.5 |
| 2,505,899 | 5/1950 | Jobe | 248/205.7 |
| 2,827,719 | 3/1958 | Nairn | 40/606 |
| 4,279,396 | 7/1981 | Bendock | 248/205.5 |
| 4,848,713 | 7/1989 | Adams | 248/206.2 |
| 4,991,806 | 2/1991 | Nakamura et al. | 248/206.2 |
| 5,078,356 | 1/1992 | Adams | 248/206.2 |
| 5,356,102 | 10/1994 | Blumenaus | 248/205.5 |
| 5,595,364 | 1/1997 | Protz, Jr. | 248/205.5 |

Primary Examiner—Anita M. King
Attorney, Agent, or Firm—Buchanan Ingersoll, P.C.

[57] ABSTRACT

A suction cup for holding signs has a cup portion and a neck portion to which a clamp member is connected. The clamp member has a first leg attached to the neck portion and a second leg adjacent a top surface of the neck portion. The second leg of the clamp member is movable away from the top surface of the neck portion to allow an object, such as a sign, to be inserted and held between the top surface of the neck portion and the clamp member. The second leg is biased against the neck portion such that the top of the relatively soft neck portion is used as a gripping surface to hold the sign. The top surface of the neck portion and the second leg of the clamp may have various surface configurations such as notches or grooves to enhance the gripping force therebetween.

12 Claims, 4 Drawing Sheets

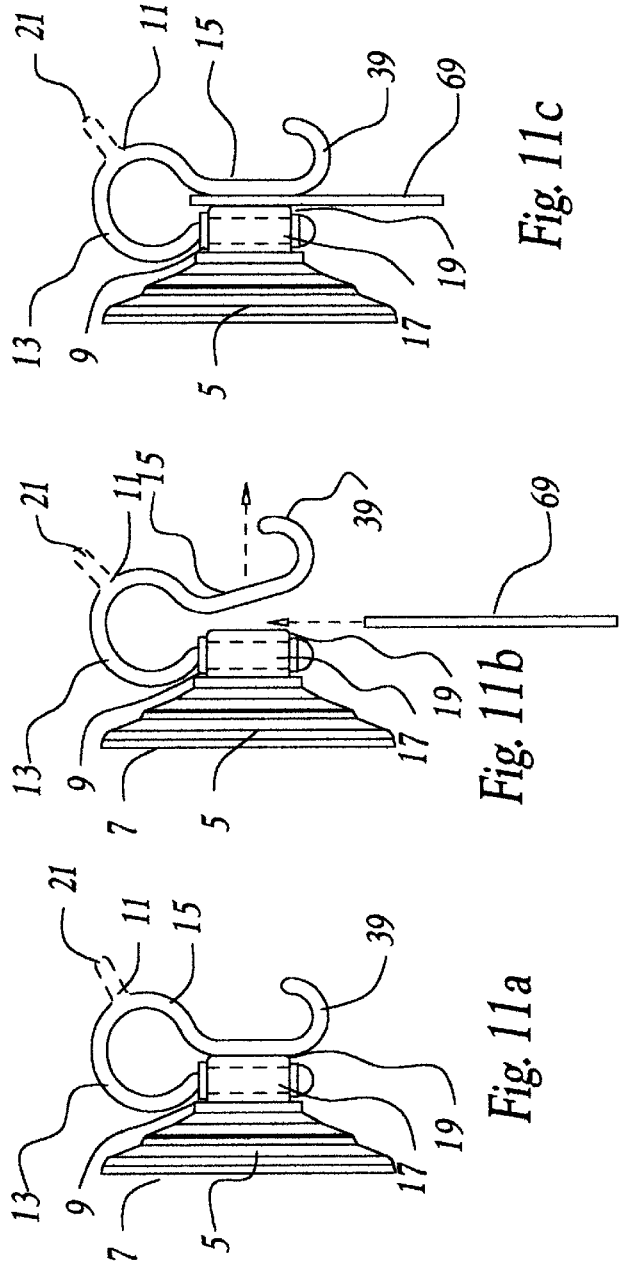

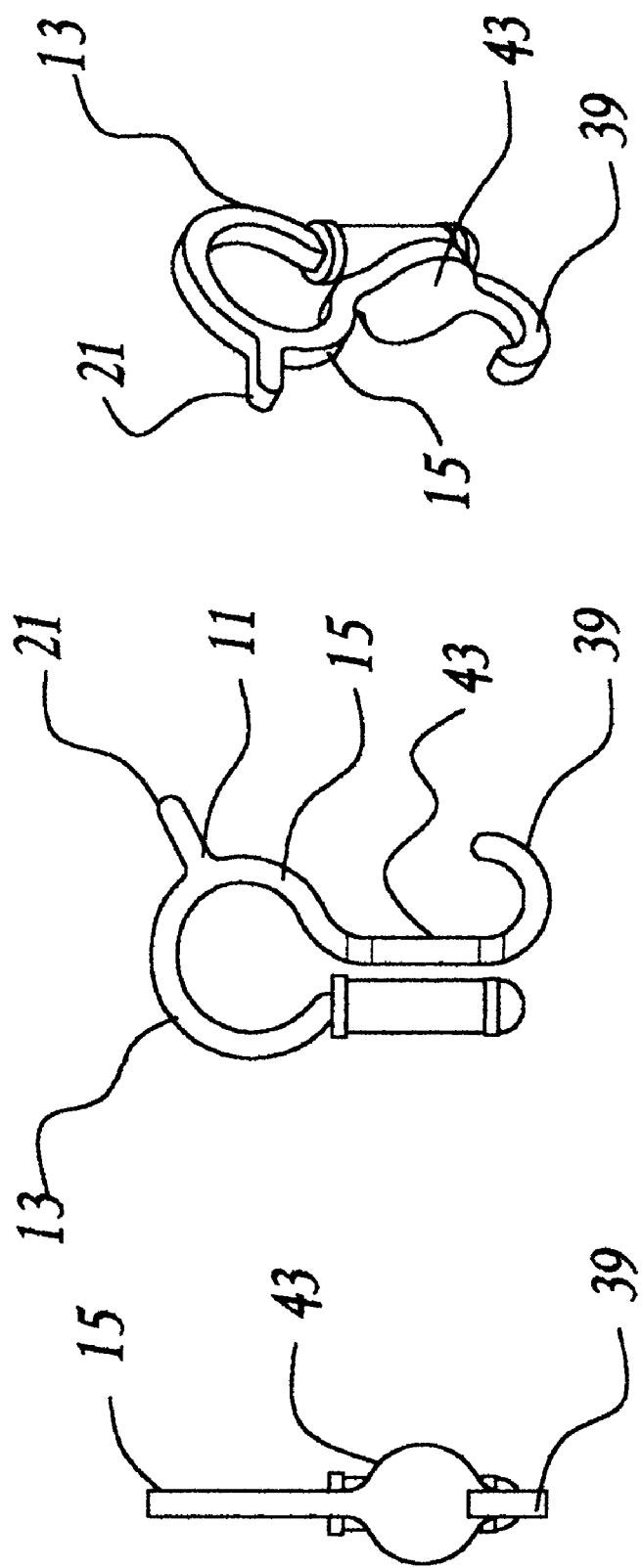

SUCTION CUP HOLDER WITH ONE PIECE CLIP

BACKGROUND

1. Field of the Invention

The invention relates generally to suction cups for holding objects, and more particularly, to a suction cup with an attachment for holding signs and other objects.

2. Description of Related Art

Suction cups with attachments for holding things are well known in the art. For example, it is well known to provide a suction cup having some type of clamp device connected to the neck of the suction cup for holding relatively thin flat objects, such as signs. Some examples of such suction cup sign holders are described in U.S. Pat. Nos. 1,992,900 to Plante; U.S. Pat. No. 840,618 to Golombek; U.S. Pat. No. 1,575,789 to Phelps; U.S. Pat. No. 253,392 to Jones et al.; U.S. Pat. No. 4,279,396 to Bendock; U.S. Pat. No. 1,847,403 to Loughman; U.S. Pat. No. 5,356,102 to Blumenaus and U.S. Pat. No. 2,276,992 to Manzler. The suction cup sign holders described in Plante, Golombek, Phelps, Jones, Bendock and Loughman each have a clamp member connected to the neck of the suction cup which has a pair of arms between which the sign is clamped. In each case, some means is provided for separating the arms to insert the object and then for biasing the arms closed to hold the object once it is inserted therebetween. In Blumenaus and Manzler, the clamp device has only one arm which clamps the object between the arm and the surface to which the suction cup is attached. Like the other devices though, some means is provided for moving the arm away from the other clamping surface to insert the sign and then biasing the arm back towards that surface to hold the object therebetween.

Other types of suction cup holders are disclosed in U.S. Pat. No. 1,839,694 to Nelson et al. and U.S. Pat. No. 2,467,251 to Bowman. In Nelson, there is no clamp member. Instead, the neck of the suction cup is provided with a slit partially through the neck portion. The resiliency of the material from which the neck portion is formed causes the slit to tend to remain closed. The neck can be bent to open the slit to insert a thin object therein and then released so that the slit closes to hold the object. An obvious limitation to such device is the relatively limited amount of gripping force which Obtained. In Bowman, the neck of the suction cup is formed into a bracket-like member having spaced apart arm portions between which an object, such as a pair of eye glasses may be inserted and supported. The arms are not biased toward each other but, instead, the space therebetween is sized to frictionally hold an object having a certain width, such as the bridge of a pair of glasses.

In all of the devices previously described suction cup sign holders utilizing a clamping device to hold signs, the sign is held either between two arms of the clamp or between an arm of the clamp and the surface to which the suction cup is attached. As such, the holding power of the clamp is a function of the clamping force and the coefficient of friction between the sign and either the clamp arms or the surface to which the suction cup is attached. In each of these suction cup clamp devices, the clamp arms are made from a relatively hard, smooth material. Also, the surface to which the suction cup is attached is normally hard and very smooth. The coefficient of friction between hard, and especially smooth, objects is typically much lower than the coefficient of friction of a relatively soft material, such as the type of vinyl from which suction cups are normally made. None of the described suction cup and clamp devices utilize the soft vinyl surface of the neck portion as one of the clamping surfaces between which the sign is held. Although the suction cup holders described in Nelson and Bowman do employ the soft material of the suction cup as part of the holding members, there is no clamp member to provide sufficient clamping force to securely hold relatively thick or heavy signs.

To increase the gripping power of the devices using clamps, the spring force biasing the clamp members toward each other, or toward the surface which the suction cup is attached, generally has to be increased. Increasing the biasing force can result in making it harder to open the clamp which also can increase the likelihood that the suction cup will inadvertently detach from the surface to which it is attached while attempting open the clamp to insert the sign.

Thus, there is a need for a suction cup sign holder which can grip the sign between a clamp member and the relatively soft neck of the suction cup to obtain increased gripping strength by virtue of greater friction instead of increasing the amount force biasing the clamping surfaces together.

SUMMARY

A suction cup holder for holding objects, such as signs, is provided wherein a clamp member is connected to the neck portion of a suction cup. The clamp member has a first end which is attached to the neck portion and a second end which is positioned adjacent the top of the neck portion. The second end can be moved away from the top of the neck portion to allow an object, such as a sign, to be inserted between the neck portion and the second end. The second end can then be biased against the top of the neck portion to hold the object therebetween. In this arrangement, the top of the relatively soft neck portion is used as one gripping surface and the second end of the clamp member is used as the opposing gripping surface. A transverse bore is provided in the neck portion and the first end of the resilient clamp member is sized to be inserted through and frictionally retained therein. Alternatively, an annular groove may be provided in the outer surface of the neck portion and the first end of the clamp may have a slot therein. The relatively soft neck portion can be inserted through the slot such that the neck is captured therein with the sides of the slot disposed in the annular groove. The top surface of the neck portion and the second end of the clamp between which the object is held can be provided with various surface configurations, such as notches or grooves, to enhance the gripping force therebetween.

Other details, objects, and advantages of the invention will become apparent from the following detailed description and the accompanying drawings figures of certain embodiments thereof.

BRIEF DESCRIPTION OF THE DRAWING FIGURES

A more complete understanding of the invention can be obtained by considering the following detailed description in conjunction with the accompanying drawings, in which:

FIG. 9 is a side view of a clamp member having a spiral shaped second leg;

FIG. 10 is a side view of a clamp member having connecting members provided on distal portions of each leg; and FIGS. 11a–11c are side views of the embodiment shown in FIG. 1 which illustrate how a sign may be inserted in and held by the clamp member.

FIG. 12 is a front view of an another embodiment of the clamp member shown in FIG. 1.

FIG. 13 is a side view of the embodiment shown in FIG. 12.

FIG. 14 is a perspective view of the embodiment shown in FIGS. 12 and 13.

DETAILED DESCRIPTION OF THE PREFERRED EMBODIMENTS

Figure 1:
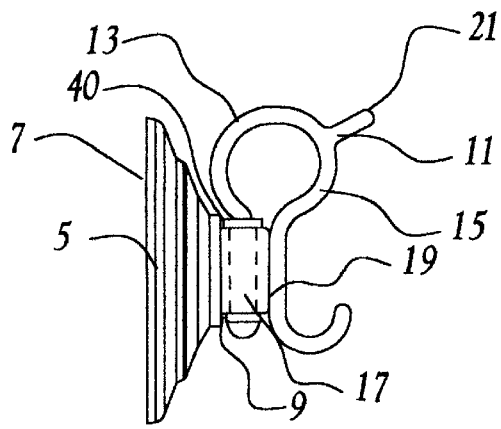
FIG. 1 is a side view of a first preferred embodiment of the suction cup holder with one piece clip.
Figure 5:
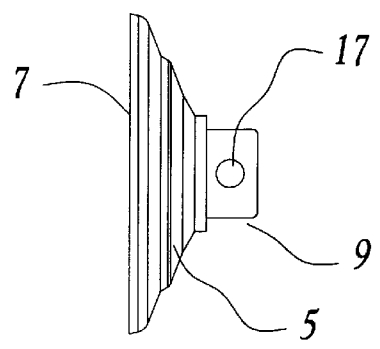
FIG. 5 is a top view of the suction cup having a transverse bore provided through the neck portion which can be used in the embodiment of FIG. 1.

Referring now to the drawing figures wherein like reference numbers refer to similar parts throughout the several views, a presently preferred suction cup holder is shown in FIG. 1 wherein a suction cup 5 has cup portion 7 and a neck portion 9 to which a one piece clip or clamp member II is connected. The cup portion can attach the suction cup 5 and clamp member 11 to a smooth surface, such as a window pane to, for example, display a sign which can be held by the clamp member 11. The clamp member 11 is preferably a unitary member formed of a resilient material and has a generally "U" or spiral-shaped configuration having a first leg 13 and a second leg 15 which curves over opposite the first leg 13. A distal end of the first leg 13 is attached to the neck portion 9 of the suction cup 5 by inserting the end of the first leg 13 through a transverse bore 17 provided through the neck portion 9. The transverse bore 17 can generally be round, as shown in FIG. 5, but can also have different shapes if desired. The end of the first leg 13 is sized to be frictionally held in the bore 17. The second leg 15 of the clamp member 11 is normally biased against the top surface 19 of the neck portion 9. In this configuration, a portion of the second leg 15 and the top surface 19 of the neck portion 9 act as gripping surfaces. To hold a sign, the second leg 15 is drawn away from the top surface 19 of the neck portion 9 to permit part of a sign to be inserted. Once the sign is inserted, the second leg 15 is permitted to return to its biased position against the top surface of the neck portion 9 such that the sign is firmly gripped therebetween. FIGS. 11a through 11c illustrate this procedure. The clamp member 11 is preferably formed from a resilient material such as polycarbonate which enables the second leg 15 to be drawn away from the neck 9 sufficiently to create a gap between the second leg and the top surface 19. The sign is then inserted into the gap and the second leg 15 is released. The resiliency of the material from which the clamp member 11 is formed causes the second leg 15 to return to its undeflected position biased against the top surface 19 and thereby hold the sign in place. Although preferably a one piece resiliently deflectable member, the clamp could alternatively be made from two or more parts which have mechanical means for opening and closing the second leg 15 with respect to the neck 9.

The suction cup 5, including the neck portion 9, is preferably formed from a relatively soft vinyl material. The coefficient of friction between the soft vinyl top surface 19 of the neck 9 portion and the sign material results in improved gripping strength compared to clamping the sign between a pair of metal or hard plastic clamp members. The increased friction permits improved gripping strength which reduces the clamping force otherwise required to be built into the clamp member.

To aid in drawing the second leg 15 away from the top surface 19 of the neck portion 9, an arm 21 can be provided on the clamp member 11 near the junction of the two legs 13, 15. The arm 21 is pushed to separate the second leg 15 from the top surface 19 of the neck portion 9. When pushed, the arm 21 acts as a lever to pry the second leg 15 away from the neck portion 9.

Figure 2:
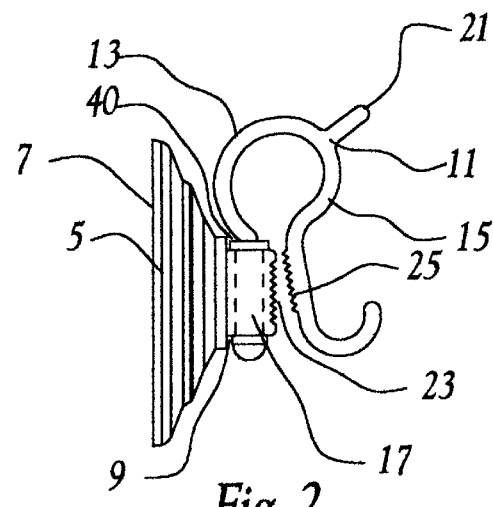
FIG. 2 is a side view of a second preferred embodiment similar to the embodiment of FIG. 1 wherein the top of the neck portion and the second end of the clamp member are differently configured.
Figure 3:
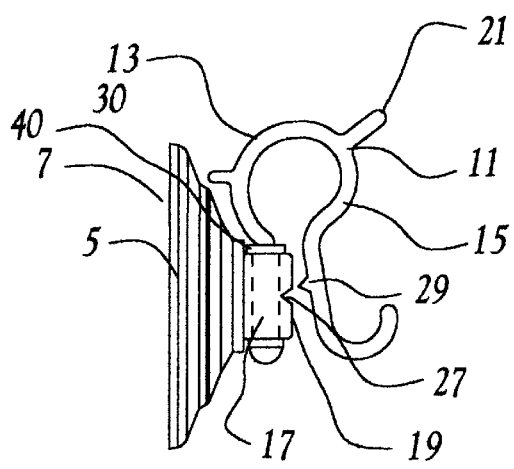
FIG. 3 is a side view of a third preferred embodiment similar to the previous embodiments wherein the top of the neck portion and the second end of the clamp member are configured in a third preferred manner.

Referring now to FIGS. 2 and 3, the second leg 15 and the top surface 19 of the neck portion 9 can be configured in other ways to enhance the gripping strength therebetween. For example, in the embodiment shown in FIG. 2 the top surface 19 of the neck 9 is provided with grooves 23 and a portion of the second leg 15 which is adjacent the top surface 19 of the neck 9 is provided with mating teeth 25. When an object is clamped therebetween the mating surfaces tend to cause the object to conform to the grooves 23 and teeth 25 such that increased resistance to slipping is provided. Thus, it is more difficult for the sign to slip, or be pulled, from between the clamping surfaces. A similar embodiment is illustrated in FIG. 3 wherein a notch 27 is provided in the top surface 19 of the neck portion 9 and a spike 29 is provided on the second leg 15 which mates with the notch 27. Like the grooves 23 and teeth 25, the notch 27 and spike 29 can provide increased resistance to the sign slipping, or being pulled, from between the clamping surfaces. Additionally, a protrusion 30 can be provided on the underside of the first leg which can help stabilize the clamp member 11 when the arm 21 is pushed to separate the second leg 15 from the top surface 19 of the neck portion 9.

Figure 4:
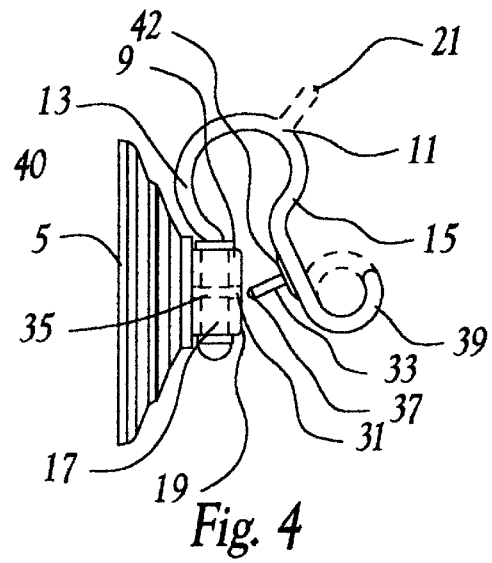
FIG. 4 is a side view of a fourth preferred embodiment wherein the top of the neck portion and the second end of the clamp member are configured in a fourth preferred manner.

Another embodiment is shown in FIG. 4 which can provide even more resistance to the sign slipping or being pulled from between the clamping surfaces. In this embodiment, a hole 31 is provided axially through the neck portion 9 of the suction cup 5 and a pin 33 is provided which projects from the second leg 15. The pin 33 fits into the axial hole 31 when the second leg 15 is biased against the top surface 19 of the neck portion 9. The pin 33 can be designed to pierce the sign material or a hole can be provided in the sign prior to inserting it between the clamping surfaces. Additionally, in this configuration, the first leg 13 can also be provided with a hole 35 axially therethrough which is positioned to align with the axial hole 33 in the neck portion 9. The pin 33 on the second leg 15 can project sufficiently far that it passes through the axial holes 31, 35 in both the neck portion 9 and the first leg 13 to provide increased resistance to the pin 33 being pulled away from the neck portion 9. To guard against the pin 33 being dislodged from the axial hole 35 in the first leg 13, a nub 37 can be provided on the tip of the pin 33 which is sized to snap into the axial hole 35 in the first leg 13 so that even more force would be required to pull the pin 33 away from the neck portion 9. In this embodiment, the second leg 15 has a curved extension 39 which projects from the second leg 15 away from the neck 9 and can be grasped to pull the second leg 15 away from the top surface 19 of the neck portion 9. That extension 39 generally forms a loop for easier gripping as indicated by the dotted lines in FIG. 4. Additionally, an arm 21 could also be provided to pry the second leg 15 away from the neck portion 9. The security provided by such a locking arrangement in the embodiment of FIG. 4 makes this device ideal for hanging objects securely. Stained glass and crystal as well as an outdoor thermometer may be both safely and securely held. Extension 39 may also form a hook for this reason. Disc 42 can be added to this and other embodiments to enhance the grip on the paper and reduce tearing.

A collar 40 may be provided on the first leg 13 to center the resilient member on the neck portion 9 such that the portion of the second leg 15 which acts as a gripping surface is aligned substantially over the top surface 19. Also, such a collar 40 may be desirable in embodiments where the clamping surfaces are specially configured, such as in FIGS. 2–4, to aid in aligning the surfaces to ensure that they properly mate together.

Figure 6:
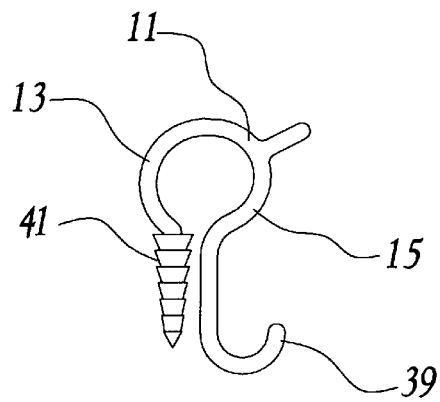
FIG. 6 is a side view of an embodiment of a clamp member having threads on one leg thereof.

To more securely retain the end of the first leg 13 within the transverse bore 17 through the neck portion 9 of the suction cup 5, threads 41, or thread-like grooves, can be provided on the end of the first leg 13, as shown in FIG. 6. The direction of the threads 41 make is easy to insert the first end 13 into the bore 17 but resist being removed therefrom once inserted.

Figure 7:
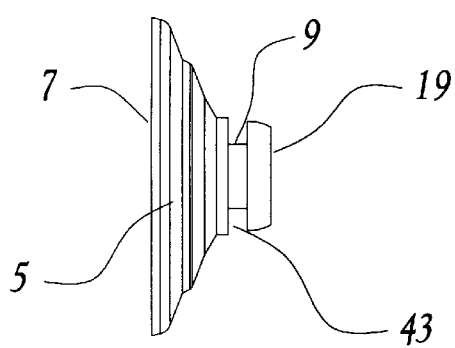
FIG. 7 is a side view of the suction cup having an annular groove provided in the neck portion.
Figure 8:
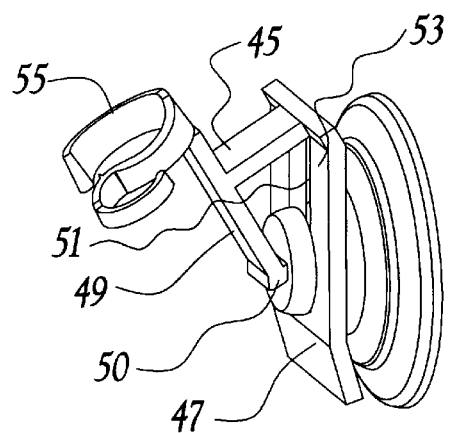
FIG. 8 is a perspective view of an alternative embodiment of a clamp member having a slot connected to the annular groove in the suction cup shown in FIG. 7.

An alternative manner of connecting a clamp member 45 to the neck portion 9 of the suction cup 5 is shown in FIGS. 7 and 8. In this embodiment, rather than providing a transverse bore 17 through the neck 9, an annular groove 43 is provided in the outside surface of the neck 9, as shown in FIG. 7. To connect to the annular groove 43, the first leg 47 of a clamp member 45 is provided with a slot 51, as shown in FIG. 8. The relative soft neck portion 9 of the suction cup 5 shown in FIG. 8 can be deformed sufficiently to be inserted through the slot 51 such that the sides 53 of the slot 51 are disposed in the annular groove 43 and thereby retain the clamp member 45 to the neck portion 9. Alternatively, the slot 51 could extend to the bottom of first leg 47 such that leg 47 would have a pair of spaced apart prongs. The embodiment of the clamp member 45 shown in FIG. 8 can additionally include a holder 55 for a decorative light provided on the end of the second leg 49 opposite the clamping end 50. Thus, several of these sign holders could be used to hold a light stand of Christmas lights may also be held along with the sign. The light holder 55 on the end of the second leg 49 can also be used as a lever arm to open a gap between the clamp end 50 of the second leg 49 and the top surface 19 of the neck portion 9.

The second leg of the clamp member can be formed in a variety of configurations, such as, for example, a spiral shape as shown in FIG. 9., to provide increased holding power or to guard against the second leg 15 of the clamp member 11 from becoming inadvertently dislodged away from the top surface 19 of the neck portion 9.

The clamp member 11 can be configured such that both the first and second legs 13, 15 have a distal portion 57, 59 which extends past the neck portion 9, as shown in FIG. 10. These distal portions 57, 59 are provided with connecting members 61, 63 on adjacent surfaces of each leg 13, 15. These connecting members 61, 63 are configured to mate with or attach to each other and distort or pierce the surface of the sign material. A hole can be provided in the sign material for the connecting members 61, 63. It should be understood that various means for permanently or releasably interlocking the connecting members 61, 63 may be satisfactorily employed and the particular connecting members illustrated are by way of example only.

The steps for attaching a sign to such suction cup sign holder are illustrated in FIGS. 11a–11c. As shown in FIG. 11b, the curved extension 39 of the second leg 15 is drawn away from the top surface 19 of the neck 9 and the sign 69 is inserted therebetween. The curved extension 39 of the second leg 15 can be grasped and pulled or, where provided, the arm 21 can be pushed, to move the second leg 15 away from the top surface 19 of the neck 9. After the sign, or portion thereof, is inserted the second leg 15 is allowed to return to its normal position biased against the top surface 19 such that the sign is held therebetween, as shown in FIG. 11c.

In most of the previous embodiments the legs of the clamp portion 11 are relatively narrow. However, as shown in the embodiment of FIGS. 12, 13 and 14 the portion 43 of the leg 15 which abuts the cup could be enlarged to a circular shape which would fully cover the top of the neck of the suction cup.

All of the embodiments of the present suction cup holder retain the sign between a resilient clamp and the top of the neck or head of the suction cup. Because that top has a lower durometer than the clamp the sign will be more securely held than if the sign had been clamped between two legs of a resilient clamp attached to a suction cup.

Although certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A suction cup holder comprising:
   a. a suction cup having a cup portion and a neck portion extending therefrom, the neck portion having a top surface;
   b. a clamp member formed from a resilient material having a first leg connected to said neck portion and a second leg adjacent said top surface;
   c. said second leg movable away from said top surface to insert an object therebetween; and
   d. said first and second legs being joined together at one end thereof such that said second leg is deflectable away from said first leg and said resilient material enables said second leg to return to an undeflected position biased against said top surface to hold said object therebetween.

2. The suction cup holder of claim 1 further comprising:
   a. said neck portion having a transverse bore therethrough; and
   b. said first leg being disposed through said bore to connect said clamp member to said neck portion.

3. A suction cup holder-comprising:
   a. a suction cup having a cup portion and a neck portion extending therefrom, the neck portion having a top surface;

b. a clamp member formed from a resilient material having a first leg connected to said neck portion and a second leg adjacent said top surface;

c. said second leg movable away from said top surface to insert an object therebetween;

d. said first and second legs being joined together at one end thereof such that said second leg is deflectable away from said first leg and said resilient material enables said second leg to return to an undeflected position biased against said top surface to hold said object therebetween;

e. said neck portion having a transverse bore therethrough;

f. said first leg being disposed through said bore to connect said lamp member to said neck portion;

g. said top surface having grooves provided therein; and h. said second leg having mating grooves on a surface thereof adjacent said top surface.

4. A suction cup holder comprising:

a. a suction cup having a cup portion and a neck portion extending therefrom, the neck portion having a top surface;

b. a clamp member formed from a resilient material having a first leg connected to said neck portion and a second leg adjacent said top surface;

c. said second leg movable away from said top surface to insert an object therebetween;

d. said first and second legs being joined together at one end thereof such that said second leg is deflectable away from said first leg and said resilient material enables said second leg to return to an undeflected position biased against said top surface to hold said object therebetween;

e. said neck portion having a transverse bore therethrough;

f. said first leg being disposed through said bore to connect said clamp member to said neck portion;

g. said top surface having a notch therein; and h. said second leg having a spike on a surface thereof adjacent said top surface and said spike mating with said notch.

5. A suction cup holder comprising:

a. a suction cup having a cup portion and a neck portion extending therefrom, the neck portion having a top surface;

b. a clamp member formed from a resilient material having a first leg connected to said neck portion and a second leg adjacent said top surface;

c. said second leg movable away from said top surface to insert an object therebetween;

d. said first and second legs being joined together at one end thereof such that said second leg is deflectable away from said first leg and said resilient material enables said second leg to return to an undeflected position biased against said top surface to hold said object therebetween;

e. said neck portion having a transverse bore therethrough;

f. said first leg being disposed through said bore to connect said clamp member to said neck portion;

g. said neck portion having an axial bore therethrough; and h. said second leg having a pin extending from a surface thereof adjacent to said top surface and said pin disposed in said axial bore when said second leg is biased against said top surface.

6. The suction cup holder of claim 5 further comprising said first leg having a hole therein axially aligned with said pin such that said pin may extend through said axial bore in said neck portion and into said hole when said second leg is biased against said top surface.

7. A suction cup holder comprising:

a. a suction cup having a cup portion and a neck portion extending therefrom, the neck portion having a top surface;

b. a clamp member formed from a resilient material having a first leg connected to said neck portion and a second leg adjacent said top surface;

c. said second leg movable away from said top surface to insert an object therebetween;

d. said first and second legs being joined together at one end thereof such that said second leg is deflectable away from said first leg and said resilient material enables said second leg to return to an undeflected position biased against said top surface to hold said object therebetween;

e. said neck portion having a transverse bore therethrough;

f. said first leg being disposed through said bore to connect said clamp member to said neck portion; and g. said first leg having one of ridges and threads provided thereon for improved gripping when said first leg is disposed through said transverse bore to frictionally retain said first leg in said transverse bore.

8. A suction cup holder comprising:

a. a suction cup having a cup portion and a neck portion extending therefrom, the neck portion having a top surface;

b. a clamp member formed from a resilient material having a first leg connected to said neck portion and a second leg adjacent said top surface;

c. said second leg movable away from said top surface to insert an object therebetween;

d. said first and second legs being joined together at one end thereof such that said second leg is deflectable away from said first leg and said resilient material enables said second leg to return to an undeflected position biased against said top surface to hold said object therebetween;

e. said neck portion having a transverse bore therethrough;

f. said first leg being disposed through said bore to connect said clamp member to said neck portion; and g. said first leg having a collar disposed thereon and said collar abutting said neck portion when said first leg is disposed through said transverse bore.

9. The suction cup holder of claim 1 further comprising an arm extending from said second leg and positioned to be able to act as a lever to move said second leg away from said top surface so that said object can then be placed between said top surface and said second leg.

10. A suction cup holder comprising:

a. a suction cup having a cup portion and a neck portion extending therefrom, the neck portion having a top surface;

b. a clamp member formed from a resilient material having a first leg connected to said neck portion and a second leg adjacent said top surface;

c. said second leg movable away from said top surface to insert an object therebetween;

d. said first and second legs being joined together at one end thereof such that said second leg is deflectable away from said first leg and said resilient material enables said second leg to return to an undeflected position biased against said top surface to hold said object therebetween; and e. an arm extending from said second leg and positioned to be able to act as a lever to move said second leg away from said top surface so that said object can then be placed between said top surface and said second leg; and f. said clamp member having a protrusion on an underside of said first leg.

11. The suction cup holder of claim 1 further comprising:

a. said first and second legs each having a distal portion extending beyond said neck portion and said top surface, respectively;

b. said first leg distal portion having a first mating portion; and c. said second leg distal portion having a second mating portion which mates with said first mating portion when said second leg is biased against said top surface.

12. The suction cup holder of claim 1 further comprising:

a. said neck portion having an annular groove provided in an outer side thereof;

b. said first leg having a slot provided therethrough; and c. wherein a portion of said neck portion extends through the slot such that side portions of said slot are engaged in said annular groove to retain said first leg to said neck portion.

* * * * *

UNITED STATES PATENT AND TRADEMARK OFFICE
CERTIFICATE OF CORRECTION

PATENT NO. : 6,131,865
DATED : October 17, 2000
INVENTOR(S) : WILLIAM E. ADAMS

It is certified that error appears in the above-indentified patent and that said Letters Patent is hereby corrected as shown below:

Column 7, line 15, claim 3, change "lamp" to --clamp--.

Signed and Sealed this

Sixth Day of March, 2001

Attest:

NICHOLAS P. GODICI

*Attesting Officer*   *Acting Director of the United States Patent and Trademark Office*